(12) United States Patent
Martinez et al.

(10) Patent No.: US 11,863,825 B2
(45) Date of Patent: Jan. 2, 2024

(54) SMART MEDIA DISPLAY

(71) Applicant: AERIAL TECHNOLOGIES INC., Montreal (CA)

(72) Inventors: Michel Allegue Martinez, Terrebonne (CA); Negar Ghourchian, Montreal (CA); David Grant, Santa Rosa Valley, CA (US); Francois Morel, Kirkland (CA); Pascal Paradis-Theberge, Montreal (CA)

(73) Assignee: Aerial Technologies Inc., Montreal (CA)

( * ) Notice: Subject to any disclaimer, the term of this patent is extended or adjusted under 35 U.S.C. 154(b) by 0 days.

(21) Appl. No.: 17/539,872

(22) Filed: Dec. 1, 2021

(65) Prior Publication Data
US 2022/0167050 A1  May 26, 2022

Related U.S. Application Data

(63) Continuation of application No. 16/796,662, filed on Feb. 20, 2020, now Pat. No. 11,218,769.
(Continued)

(51) Int. Cl.
*H04N 21/45* (2011.01)
*H04N 21/458* (2011.01)
(Continued)

(52) U.S. Cl.
CPC ....... *H04N 21/458* (2013.01); *G06Q 30/0246* (2013.01); *H04N 21/26241* (2013.01); *H04N 21/44218* (2013.01)

(58) Field of Classification Search
CPC .......... H04N 21/458; H04N 21/26241; H04N 21/44218; H04N 21/44204; H04N 21/4524; H04N 21/812; G06Q 30/0246
See application file for complete search history.

(56) References Cited

U.S. PATENT DOCUMENTS 8,073,441 B1  12/2011  Unger et al.
8,461,988 B2   6/2013  Tran
(Continued)

FOREIGN PATENT DOCUMENTS

CA  3044480    5/2018
CN  105828289  8/2016
(Continued)

OTHER PUBLICATIONS

U.S. Appl. No. 16/798,148 Final Office Action dated Apr. 8, 2022.
(Continued)

*Primary Examiner* — Timothy R Newlin
(74) *Attorney, Agent, or Firm* — Rosenberg, Klein & Lee

(57) ABSTRACT

A method of utilizing Wi-Fi based passive motion detection to deliver targeted advertising through a smart TV is provided. The system uses an agent in connection with the wireless access point that the Smart TV uses to access the internet to make motion determinations. The CSI data of the access point is analyzed to identify if a user is present, if the user is stationary, the previous location of the user, and the activity the user is currently engaged in. An advertisement may be selected based on a last visited location and activity. Such advertisements may further be delivered to more engaged viewers when the advertiser pays a higher rate.

20 Claims, 10 Drawing Sheets

| Advertisement | Engagement Level | Relevant Locations | Rating | Average Engagement Delta | Sample Size | Flag |
|---|---|---|---|---|---|---|
| blender.vid | Med | Kitchen | High | NA | | 0 |
| Sheets.vid | High | Bedroom | Med | | 2 | 9 Positive |
| Travel.vid | Low | Living Room/Kitchen/Bathroom | Low | Static | | 3 |
| Toilet Paper.vid | Med | Bathroom/Kitchen | Low | -1 | | 2 |
| Pillow.vid | High | Bedroom | High | | 2 | 9 Positive |

Related U.S. Application Data

(60) Provisional application No. 62/809,027, filed on Feb. 22, 2019, provisional application No. 62/809,019, filed on Feb. 22, 2019.

(51) Int. Cl.
*G06Q 30/0242* (2023.01)
*H04N 21/262* (2011.01)
*H04N 21/442* (2011.01)

(56) References Cited

U.S. PATENT DOCUMENTS

| | | | |
|---|---|---|---|
| 8,864,663 B1 | 10/2014 | Kahn | |
| 9,219,790 B1* | 12/2015 | Filev | H04L 67/535 |
| 9,414,115 B1* | 8/2016 | Mao | H04N 21/2668 |
| 9,703,892 B2 | 7/2017 | Ramer et al. | |
| 9,786,138 B1* | 10/2017 | Kashyap | G08B 13/2491 |
| 9,854,292 B1* | 12/2017 | Matthews | G06F 16/2455 |
| 9,865,154 B2* | 1/2018 | Dey | G08B 25/008 |
| 9,867,548 B2 | 1/2018 | Le et al. | |
| 9,985,846 B1* | 5/2018 | Roman | H04L 41/24 |
| 10,045,191 B2 | 8/2018 | Nguyen et al. | |
| 10,374,646 B1 | 8/2019 | Fletcher | |
| 10,419,880 B1 | 9/2019 | Long et al. | |
| 10,818,384 B1 | 10/2020 | Peterson et al. | |
| 10,999,705 B2 | 5/2021 | Martinez | |
| 11,017,688 B1 | 5/2021 | Arazi | |
| 11,039,278 B1 | 6/2021 | Carreiro et al. | |
| 11,082,109 B2 | 8/2021 | Martinez | |
| 11,218,769 B2 | 1/2022 | Martinez | |
| 11,448,726 B2 | 9/2022 | Martinez | |
| 11,523,253 B2 | 12/2022 | Martinez | |
| 11,586,952 B2 | 2/2023 | Martinez | |
| 11,593,837 B2 | 2/2023 | Martinez | |
| 11,611,382 B2 | 3/2023 | Martinez | |
| 2002/0188668 A1 | 12/2002 | Jeffery et al. | |
| 2003/0160701 A1* | 8/2003 | Nakamura | G08B 13/2491 340/539.13 |
| 2006/0224938 A1* | 10/2006 | Fikes | G06F 16/955 707/E17.112 |
| 2007/0024580 A1* | 2/2007 | Sands | G06Q 30/02 345/156 |
| 2007/0266395 A1* | 11/2007 | Lee | H04N 21/43615 348/E7.054 |
| 2008/0262909 A1 | 10/2008 | Li et al. | |
| 2010/0242063 A1* | 9/2010 | Slaney | H04N 21/458 725/32 |
| 2011/0029277 A1 | 2/2011 | Chowdhary et al. | |
| 2011/0117924 A1* | 5/2011 | Brunner | G01S 19/47 455/456.1 |
| 2011/0129047 A1 | 6/2011 | Mashino et al. | |
| 2011/0158432 A1* | 6/2011 | Lee | H03G 9/025 381/107 |
| 2011/0258039 A1* | 10/2011 | Patwa | G06Q 30/00 705/14.45 |
| 2012/0053472 A1 | 3/2012 | Tran | |
| 2012/0135733 A1 | 5/2012 | Cormier et al. | |
| 2012/0289147 A1* | 11/2012 | Raleigh | H04N 21/25808 455/3.06 |
| 2012/0324494 A1* | 12/2012 | Burger | H04N 21/25891 725/12 |
| 2013/0014136 A1* | 1/2013 | Bhatia | H04N 21/47815 725/9 |
| 2013/0028443 A1* | 1/2013 | Pance | H04S 7/305 381/107 |
| 2013/0053990 A1 | 2/2013 | Ackland | |
| 2013/0076528 A1 | 3/2013 | Boettner | |
| 2013/0102256 A1 | 4/2013 | Cendrillon et al. | |
| 2013/0115974 A1* | 5/2013 | Lee | H04W 4/025 455/456.6 |
| 2013/0326554 A1* | 12/2013 | Shkedi | H04N 21/812 725/34 |
| 2014/0033240 A1* | 1/2014 | Card, II | H04N 21/2668 725/14 |
| 2014/0105420 A1* | 4/2014 | Lee | H04H 20/106 381/107 |
| 2014/0181100 A1 | 6/2014 | Ramer et al. | |
| 2014/0223467 A1* | 8/2014 | Hayton | H04N 21/4668 725/18 |
| 2014/0278389 A1 | 9/2014 | Zurek et al. | |
| 2014/0358012 A1* | 12/2014 | Richards | H04W 4/027 600/479 |
| 2015/0026708 A1* | 1/2015 | Ahmed | H04N 5/23206 725/12 |
| 2015/0050923 A1 | 2/2015 | Tu et al. | |
| 2015/0092747 A1 | 4/2015 | Ganesan | |
| 2015/0110471 A1* | 4/2015 | Zheng | H04N 21/44218 386/291 |
| 2015/0113556 A1* | 4/2015 | Weast | H04N 21/4524 725/32 |
| 2015/0121428 A1* | 4/2015 | Nguyen | H04N 21/4524 725/47 |
| 2015/0247915 A1* | 9/2015 | Huang | G01S 5/0273 455/456.1 |
| 2015/0365787 A1* | 12/2015 | Farrell | H04W 4/02 455/456.1 |
| 2016/0057472 A1* | 2/2016 | Gupta | H04N 21/25891 725/14 |
| 2016/0105700 A1 | 4/2016 | Collins et al. | |
| 2016/0127766 A1* | 5/2016 | Luk | H04N 21/812 386/248 |
| 2016/0174185 A1* | 6/2016 | Ramakrishnan | H04W 64/006 455/456.1 |
| 2016/0253710 A1* | 9/2016 | Publicover | H04N 21/2187 705/14.66 |
| 2016/0277529 A1 | 9/2016 | Chen et al. | |
| 2016/0315682 A1 | 10/2016 | Liu et al. | |
| 2016/0337701 A1 | 11/2016 | Khare et al. | |
| 2016/0344779 A1 | 11/2016 | Jain et al. | |
| 2017/0032191 A1 | 2/2017 | Ackland | |
| 2017/0068790 A1 | 3/2017 | Fuerst | |
| 2017/0135635 A1 | 5/2017 | Bostick et al. | |
| 2017/0160089 A1 | 6/2017 | Jang et al. | |
| 2017/0293729 A1 | 10/2017 | Movva | |
| 2017/0315711 A1* | 11/2017 | Adams | H04M 1/0237 |
| 2017/0332192 A1 | 11/2017 | Edge | |
| 2017/0354349 A1 | 12/2017 | Mohapatra et al. | |
| 2017/0366955 A1 | 12/2017 | Edge | |
| 2018/0008207 A1 | 1/2018 | Sarkela et al. | |
| 2018/0026481 A1* | 1/2018 | Ku | H02J 50/23 370/329 |
| 2018/0035072 A1* | 2/2018 | Asarikuniyil | H04N 21/4438 |
| 2018/0091952 A1 | 3/2018 | Sant et al. | |
| 2018/0181094 A1* | 6/2018 | Funk | H04L 67/12 |
| 2018/0184165 A1* | 6/2018 | Maughan | H04N 21/44226 |
| 2018/0330406 A1* | 11/2018 | Deluca | H04N 21/25841 |
| 2018/0366228 A1 | 12/2018 | Buck | |
| 2019/0035244 A1* | 1/2019 | Garg | G08B 13/2491 |
| 2019/0051342 A1 | 2/2019 | Wootton et al. | |
| 2019/0174170 A1* | 6/2019 | Chen | G06F 3/0346 |
| 2019/0178980 A1 | 6/2019 | Zhang et al. | |
| 2019/0188756 A1* | 6/2019 | Bradley | G06V 40/16 |
| 2019/0199456 A1* | 6/2019 | Chopra | H04B 17/309 |
| 2019/0246371 A1 | 8/2019 | Hwang et al. | |
| 2019/0252079 A1 | 8/2019 | Constantin et al. | |
| 2019/0306023 A1 | 10/2019 | Vasseur et al. | |
| 2019/0364380 A1* | 11/2019 | Khawand | H04B 17/318 |
| 2020/0036592 A1 | 1/2020 | Kholaif | |
| 2020/0090022 A1 | 3/2020 | Ma et al. | |
| 2020/0112939 A1 | 4/2020 | Scharf et al. | |
| 2020/0120384 A1* | 4/2020 | Armaly | H04N 21/44008 |
| 2020/0133383 A1 | 4/2020 | Ahlstrom et al. | |
| 2020/0186321 A1 | 6/2020 | Hwang et al. | |
| 2020/0226388 A1* | 7/2020 | Ghessassi | G06V 40/174 |
| 2020/0265700 A1 | 8/2020 | Bergman et al. | |
| 2020/0292572 A1 | 9/2020 | Bateni | |
| 2020/0302478 A1 | 9/2020 | Martinez | |
| 2020/0303046 A1 | 9/2020 | Martinez | |
| 2020/0327430 A1 | 10/2020 | Martinez | |
| 2020/0383119 A1 | 12/2020 | Sun et al. | |

(56) References Cited

U.S. PATENT DOCUMENTS

| | | |
|---|---|---|
| 2020/0397365 A1 | 12/2020 | Zhang et al. |
| 2021/0063537 A1 | 3/2021 | Martinez |
| 2021/0120370 A1 | 4/2021 | Martinez |
| 2021/0352441 A1 | 11/2021 | Liu |
| 2022/0060234 A1 | 2/2022 | Martinez |
| 2022/0070633 A1 | 3/2022 | Ghoshal |
| 2022/0256429 A1 | 8/2022 | Martinez |
| 2023/0003836 A1 | 1/2023 | Martinez |

FOREIGN PATENT DOCUMENTS

| | | |
|---|---|---|
| WO | WO 2016/187458 | 11/2016 |
| WO | WO 2018/094502 | 5/2018 |
| WO | WO 2020/170221 | 8/2020 |
| WO | WO 2020/240526 | 12/2020 |
| WO | WO 2021/084519 | 5/2021 |

OTHER PUBLICATIONS

U.S. Appl. No. 17/131,078 Non- Final Office Action dated Mar. 2, 2022.

Xi et al.; "Electronic Frog Eye: Counting Crowd Using WiFi", Department of Computer Science, Jul. 8, 2014.

Xu et al., "SCPL: Indoor Device-Free Multi-Subject Counting and Localization Using Radio Signal Strength", 2013.

Deng et al., "CC-DTW: An Accurate Indoor Fingerprinting Localization Using Calibrated Channel State Information and Modified Dynamic Time Warping", Sensors 19, No. 9: 1984, Apr. 28, 2019 (Apr. 28, 2019), [online] [retrieved on Aug. 20, 2020 (Aug. 20, 2020)], Retrieved from the internet: https://www.mdpif.com/1424-8220/19/9/1984.

Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Feb. 8, 2017), [online] [retrieved on Aug. 20, 2020 (Aug. 20, 2020)], Retrieved from the internet: https://aaai.org/ocs/index.php/IAAI/IAAI17/paer/view/15010.

Rui Zhou et al., "Device-free Localization Based on CSI Fingerprints and Deep Neural Networks", 15 Annual IEEE International Conference on Sensing, Communication, and Networking (SECON), Jun. 11, 2018 (Jun. 11, 2018), [online] [retrieved on Aug. 20, 2020 (Aug. 20, 2020] Retrieved from the internet: https://dl.acm.org/doi/10.1145/2639108.2639143.

Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.

Yang Wang et al., "E-eyes: Device-free Location-oriented Activity Identification Using Fine-grained Wifi Signatures", MobiCom'14, pp. 617-628 Sep. 7, 2014 (Sep. 7, 2014), [retrieved on Aug. 20, 2020 (Aug. 20, 2020)], Retrieved from the internet: https://dl.acm.org/doi/10.1145/2639205.2639143.

PCT Application No. PCT/IB2020/051503 International Preliminary Report on Patentability dated Aug. 10, 2021.

PCT Application No. PCT/IB2020/051503 International Search Report and Written Opinion dated Jul. 30, 2020.

PCT Application No. PCT/IB2020/055186 International Preliminary Report on Patentability dated Nov. 16, 2021.

PCT Application No. PCT/IB2020/055186 International Search Report and Written Opinion dated Oct. 15, 2020.

PCT Application No. PCT/IB2020/060271 International Search Report and Written Opinion dated Feb. 15, 2021.

U.S. Appl. No. 16/796,662 Office Action dated Feb. 12, 2021.

U.S. Appl. No. 16/795,198 Office Action dated Jan. 25, 2022.

U.S. Appl. No. 16/798,138 Office Action dated Sep. 8, 2020.

U.S. Appl. No. 16/798,319 Office Action dated Dec. 29, 2021.

U.S. Appl. No. 16/798,148 Office Action dated Oct. 22, 2021.

U.S. Appl. No. 17/006,579 Office Action dated Jan. 6, 2022.

PCT Application No. PCT/IB2020/060271 International Preliminary Report on Patentability dated May 3, 2022.

U.S. Appl. No. 16/794,668 Office Action dated May 24, 2022.

U.S. Appl. No. 16/798,319 Final Office Action dated Jun. 13, 2022.

U.S. Appl. No. 16/798,148 Office Action dated Jul. 26, 2022.

U.S. Appl. No. 17/392,678, Michel A. Martinez, Self-Learning Based on Wi-Fi-Based Monitoring and Augmentation, filed Aug. 3, 2021.

U.S. Appl. No. 17/524,024, Debarshi P. Ghoshal, Proximity-Based Model for Indoor Localization Using Wireless Signal, filed Nov. 11, 2021.

U.S. Appl. No. 17/902,070, Michel A. Martinez, System and Method for Presence and Pulse Detection From Wireless Signals, filed Sep. 2, 2022.

U.S. Appl. No. 17/730,940, Michel A. Martinez, System for Multi-Path 5G and Wi-Fi Motion Detection, filed Apr. 27, 2022.

U.S. Appl. No. 16/798,148 Final Office Action dated Jan. 3, 2023.

U.S. Appl. No. 18/113,902, Michel A. Martinez, Advertisement Engagement Measurement, filed Feb. 24, 2023.

U.S. Appl. No. 18/112,349, Michel A. Martinez, Robotic H Matrix Creation, filed Feb. 21, 2023.

U.S. Appl. No. 18/124,347, Michel A. Martinez, Self-Learning Based on Wi-Fi-Based Monitoring and Augmentation, filed Mar. 21, 2023.

U.S. Appl. No. 16/798,319 Office Action dated Mar. 7, 2023.

U.S. Appl. No. 17/902,070 Office Action dated Mar. 31, 2023.

\* cited by examiner

| Originating Location | Data | Destination Location | | | | | |
|---|---|---|---|---|---|---|---|
| | | Bedroom | Kitchen | Bathroom | Living Room | Basement | Dining Room |
| Bedroom | 100 | NA | 21% | | 60% | 8% | 5% |
| Kitchen | 132 | 16% | NA | | 24% | 18% | 7% |
| Bathroom | 126 | 84% | 10% | NA | | 4% | 2% |
| Living Room | 86 | 18% | 36% | | 25% NA | | 14% |
| Basement | 52 | 10% | 30% | | 40% | 10% NA | |
| Dining Room | 61 | 9% | 30% | | 20% | 40% | 1% NA |

FIG. 2

| Advertisement | Engagement Level | Relevant Locations | Rating | Average Engagement Delta | Sample Size | Flag |
|---|---|---|---|---|---|---|
| blender.vid | Med | Kitchen | High | NA | | 0 |
| sheets.vid | High | Bedroom | Med | 2 | 9 | Positive |
| travel.vid | Low | Living Room/Kitchen/Bathroom | Low | Static | | 3 |
| Toilet Paper.vid | Med | Bathroom/Kitchen | Low | -1 | 2 | |
| Pillow.vid | High | Bedroom | High | 2 | 9 | Positive |

FIG. 3

SMART MEDIA DISPLAY

CROSS-REFERENCE TO RELATED APPLICATIONS

The present application is a continuation and claims the priority benefit of U.S. patent application Ser. No. 16/796,662 filed on Feb. 20, 2020 and entitled "Smart Media Display," which claims the priority benefit of U.S. Provisional Patent Application No. 62/809,019 filed on Feb. 22, 2019 and entitled "Smart Display or Media Device Agent" and U.S. Provisional Patent Application No. 62/809,027 filed on Feb. 22, 2019, entitled "Motion-Based Targeted Advertising," the disclosures of which are incorporated herein by reference in their entirety.

BACKGROUND OF THE INVENTION

1. Field of the Invention

The present disclosure is generally related to targeted advertising, smart display, smart media devices, and passive motion detection systems.

2. Description of the Related Art

Targeted advertising is a form of advertising where online or broadcast advertisers can use sophisticated methods to target the most receptive audiences with certain traits, based on the product or person the advertiser is promoting or the platform, format, time or day, content playing, etc. These traits are motion/no motion, the length of time of the motion/no motion, location, the type of motions, etc. Knowing such traits eliminates wastage. Through the emergence of new online channels, the need for targeted advertising is increasing because companies aim to minimize wasted advertising by means of information technology. Most targeted new media advertising currently uses second-order proxies for targeting, such as tracking online or mobile web activities of consumers, associating historical web page consumer demographics with new consumer web page access, using a search word as the basis for implied interest, or contextual advertising. Wi-Fi based motion no motion traits adds new context to the advertisement selections.

Motion detection is the process of detecting a change in the position of an object relative to its surroundings or a change in the surroundings relative to an object. An example of motion detection system is a software-based monitoring algorithm which detects motions and signals the surveillance camera to begin capturing the event. An advanced motion detection surveillance system can analyze the type of motion to see if the situation warrants an alarm.

Wi-Fi location determination, also known as Wi-Fi localization or Wi-Fi location estimation refers to methods of translating observed Wi-Fi signal strengths into locations. A "radio map", consisting of sets of metadata containing information about the frequency response of the channel, and/or phase response of the channel, and/or impulse response of the channel, and/or Received Signal Strength Indicators (RSSI), and/or any other statistic that describes the wireless communication link between paired devices is stored as a "profile" to be compared later to a signal scan to recognize the location of the device doing the scanning.

It is therefore desirable to have a targeted advertising system that does not use any personal data of the user.

SUMMARY OF THE CLAIMED INVENTION

Embodiments of the present invention allow for detection of movement or no-movement using a radio signal or passive Wi-Fi signals. Embodiments of the present invention further allow for delivering targeted advertising without video analysis or access to a wireless device. The system uses passive motion data for advertisement targeting by utilizing a passive motion detection system. The passive motion detection system identifies the location of the user, the user's engagement with the smart TV, the user's previous location, and the identified activity of the user in order to select an advertisement relevant to the user's most recent activity and location. The system further utilizes engagement delta module, volume module, ad length module, location destination module, and activity history module to tailor advertisement selection.

BRIEF DESCRIPTIONS OF THE DRAWINGS

FIG. 2 illustrates an exemplary location history database.

FIG. 3 illustrates an exemplary advertisement database.

DETAILED DESCRIPTION

System and methods of using passive motion detection system are disclosed. Passive motion detection system using radio or passive Wi-Fi signal identifies the location of the user, the user's engagement with the smart TV, the user's previous location, and the identified activity of the user in order to select an advertisement relevant to the user's most recent activity and location. The system further utilizes engagement delta module, volume module, ad length module, location destination module, and activity history module to tailor advertisement selection.

Figure 1:
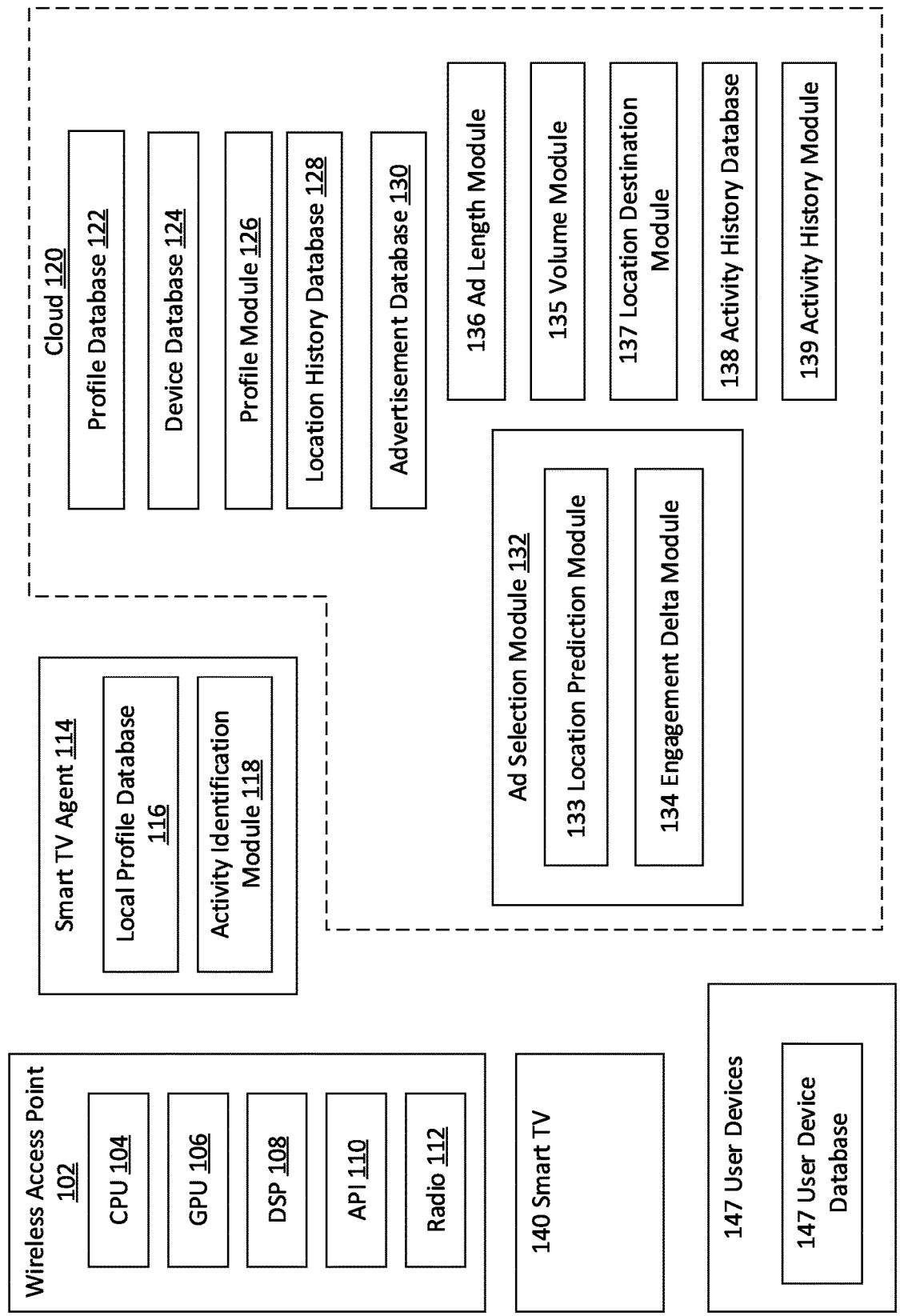
FIG. 1 illustrates an exemplary network environment in which a system for smart media display may be implemented.

FIG. 1 illustrates an exemplary network environment in which a system for smart media display may be implemented. The exemplary network environment may include a wireless access point 102, smart TV agent 114, cloud server 120, smart TV 140, and user devices 147.

In some embodiments, the wireless access point 102 is a Wi-Fi access point. In some embodiments, the wireless access point 102 is an IEEE 802.11ac or above or access point. The wireless transceiver of the wireless access point 102 is in communication with the further device over a corresponding further one of the at least one radio frequency communication link. The wireless access point 102 is configured to record a frequency response of the channel, or impulse response of the channel, into a data set for the further one of the at least one radio frequency communication link at a corresponding time.

In an embodiment, determining the activity of the person in the environment includes determining the activity of the person in the environment based on a comparison of the frequency response data set to each of the at least one frequency response profile of each of the plurality of activity profiles. In an embodiment, the activity is determined based on a sum of a similarity measurement of the frequency response data set and a similarity measurement of the further frequency response data set.

A central processing unit (CPU) 104 is the electronic circuitry within a computer that carries out the instructions of a computer program by performing the basic arithmetic, logic, controlling and input/output (I/O) operations specified by the instructions. A graphics processing unit (GPU) 106 is a specialized electronic circuit designed to rapidly manipulate and alter memory to accelerate the creation of images in a frame buffer intended for output to a display device. GPUs 106 are used in embedded systems, mobile phones, personal computers, workstations, and game consoles. Modern GPUs are very efficient at manipulating computer graphics and image processing. The highly parallel structure of the processors provide more efficient than general-purpose CPUs for algorithms that process large blocks of data in parallel.

A digital signal processor (DSP) 108 is a specialized microprocessor (or a SIP block), with its architecture optimized for the operational needs of digital signal processing. The goal of DSP 108 is usually to measure, filter or compress continuous real-world analog signals. An application program interface (API) 110 is a set of routines, protocols, and tools for building software applications. Basically, an API 110 specifies how software components should interact. Additionally, APIs are used when programming graphical user interface (GUI) components. The API 110 provides access to the channel state data to the agent 114. An access point compliant with either 802.11n or 802.11ac.

Agent 114 is a device or module configured to collect data from the Wi-Fi chipset, filter the incoming data then feed and pass the data to the cloud server 120 for activity identification. Depending on the configuration, the activity identification can be done on the edge, at the agent level, or in the "cloud" (e.g., cloud server 120), or some combination of the two. In an embodiment, the agent 114 is connected to a smart TV 140 in order to allow the ad selection module 132 on the cloud server 120 to provide advertisements to the media consumed by the user in a targeted manner based upon the engagement level and the location of the user detected.

A local profile database 116 is utilized when at least a portion of the activity identification is done on the edge. The activity identification could be a simple motion/no-motion determination profile, or a plurality of profiles for identifying activities, objects, individuals, biometrics, etc.

An activity identification module 118 is executable to distinguish between walking activities and in-place activities. In general, a walking activity causes significant pattern changes of the CSI amplitude over time, since walking involves significant body movements and location changes. In contrast, an in-place activity (such as watching TV on a sofa) only involves relative smaller body movements and may not cause significant amplitude changes but presents certain repetitive patterns within the CSI measurements. In an embodiment, the activity identification module 118 populates the activity history database with activities engaged in by users in the house that are time stamped for accessing by the ad selection module 132 in order to link the advertisement displayed to the activity the user was most recently engaged in.

A cloud server 120 analyzes and creates profiles describing various activities. Cloud server 120 may include profile database 122, device database 124, profile module 126, location history database 128, advertisement database 130, ad selection module 132, location prediction module 133, engagement delta module 134, volume module 135, ad length module 136, location destination module 137, activity history database 138, and activity history module 139.

A profile database 122 is utilized when at least a portion of the activity identification is done in the cloud server 120. The activity identification could be a simple motion/no-motion determination profile, or a plurality of profiles for identifying activities, objects, individuals, biometrics, etc.

A device database 124 stores the device ID of all connected wireless access points 102 or devices. The profile module 126 monitors the data set resulting from continuous monitoring of a target environment, to identify multiple similar instances of an activity without a matching profile in such a data set, combine that data with user feedback to label the resulting clusters to define new profiles that are then added to the profile database 122.

A location history database 128 contains all of the locations in the home that have a CSI pattern correlated to them, such as the kitchen, bathroom, bedroom, etc. For each row, which is a location in the home, there is a column with each location in the home, and those columns hold the percentage of time a user when to the column location after occupying the row location.

An advertisement database 130 contains the video file of each advertisement to be delivered. The advertisement database 130 also contains information regarding the relevant locations, such as kitchen, the rating, corresponding to the amount paid by the advertiser, and the user engagement level while the advertisement is displayed.

An ad selection module 132 may be executable to monitor the area when the user is viewing media on the smart TV in order to deliver targeted advertisements. The ad selection module 132 constantly polls the smart TV 140 for use. The ad selection module 132 determines if a user is present is the room. If the user is not present, the ad selection module 132 displays the lowest rated (the advertiser paid the lowest rate for) advertisement. If a user is detected, the user's engagement may be evaluated based on being stationary, in motion, and in motion on a trajectory that leads out of the room, with stationary being associated with the highest level of engagement and the motion leaving the room being associated with the lowest level of engagement. Medium level of engagement may be associated with the user changing location within the room but not leaving the room. Such engagement level is combined with the most recent room visited by the user to deliver an advertisement. In an embodiment, the ad selection module 132 may receive activity data compiled by the activity identification module 118 in order to select an advertisement from the advertisement database 130 that is related to the observed activity and delivered to the user device that is in proximity to the user when the user is not in proximity to the smart TV 144.

A location prediction module 133 may be executable to update the location history database 128 with the most likely next destination of the user for each location in the home.

An engagement delta module 134 may be executable to monitor the change in engagement level during ad slots to judge the positive or negative reaction of the user to the ad content. An increase in motion is seen as a decrease in engagement, and when a statistically significant sample size is reached, ads or ad categories that have a measurable impact on engagement level are flagged in the advertisement database 130 to improve the filtering by the ad selection module 132.

A volume module 135 may be executable to determine if the user begins moving at the onset of a smart TV based ad and uses that as an indication of the volume of the advertisement being too high relative to the media content and lower the volume. If the user is receiving the ad on another device, the volume module 135 may interpret the transition from no motion to motion as a cue to increase the volume of the ad as the user is active.

An ad length module 136 may be executable to determine if the user transitions from no motion to motion at the beginning of an ad, and if the ad just started, replaces the ad with a lower rate ad for the duration of the ad slot. If the ad has been on for more than a certain period of time before the user transitions from no motion to motion, the ad length module 136 flags the ad and other ads in similar category from consideration by the ad selection module 132 for future ad slots. For example, if an ad regarding a trip to Europe has been playing for more than five seconds when the user moves, the ad and the other ads of the travel category may be flagged such that the ads may be less likely to be played in the future.

A location destination module 137 continuously monitors the location of motion identified by the activity identification module 118 and populates the location history database 128. For each location identified in a home, such as bedroom, bathroom, kitchen, etc., the percentage of the time each other location in the house is the next location is observed and stored. For example, 84% of the time there is motion in the bathroom after motion was last detected in the bedroom according to FIG. 2.

An activity history database 138 stores the activity inferred by the activity identification module. When an activity takes place in a home, the activity history database 138 stores the time stamp and the location where the activity took place, such as living room, kitchen, bedroom, etc., for the ad selection module 132 to use in order to deliver an advertisement that is related to the inferred activity. Additionally, the activity history database 138 stores the average no-motion time in each locations in order to categorize the user as active, moderately active, or sedentary for the purposes of selecting ad types.

An activity history module 139 monitors how long a user is in a no-motion state in any given location for the purpose of determining the correct length and type of advertisement to display to the user.

A smart TV 140 is a television with an internet connection. User devices 146 can include computing devices, such as smartphones, tablets and personal computers, but can also include any connected device with the capacity to deliver advertisements to the user. In some embodiments, smart TV can include connected devices with screens, such as smart appliances, doorbells, video phones, etc., as well as audio only devices like voice assistant interfaces. The information on the user devices, such as the device ID and capabilities may be stored in device database 122.

FIG. 2 illustrates an exemplary location history database (e.g., location history database 128). One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The location history database 128 stores the location history of users in the home in which the system is implemented. During the training that is used to configure the system, CSI patterns are correlated specific locations in the home, such as the bathroom, kitchen, bedroom, etc. The location history database 128 tracks the history of those patterns being recognized in the output of the wireless access point 102.

In an embodiment, the location history database 128 stores the list of identified location down the first column and the for each row, which is a location in the home, there is a column with each location in the home as a destination location, and those columns hold the percentage of time a user went to the destination location after being detected in the originating location. Such data is stored and accessed when the ad selection module 132 queries the most likely next location of the user. As such, advertisements may be linked to the most likely next destination so as to make such advertisements more likely to be impactful. For example, there may be one hundred data points for motion in the bedroom according to FIG. 2. In sixty of those one hundred instances, the next location in which motion was detected was the bathroom. Such data yields the 60% figure in the bathroom destination cell in the bedroom location row. Another example is the bathroom location row. There are one hundred and twenty six data points for motion in the bedroom. In one hundred and six of those one twenty six instances, the next location in which motion was detected was the bedroom. As a result, the 84% figure is yielded for the bedroom destination cell and the bathroom location row at step 200.

FIG. 3 illustrates an exemplary advertisement database. The advertisement database 130 contains the video file and classification data related to targeted advertisements that can be delivered to the user through a smart TV 140. The advertiser can make the determinations how to deliver associated products, or the attributes can be assigned by the platform administrator. In such embodiments, the advertiser provides the relevant locations to associate with the advertised product, such as the kitchen for a blender ad, or the bathroom for a toilet paper ad. The advertisements are also classified by the level of engagement the user is exhibiting when the advertisement is going to be displayed, in an embodiment, low, medium and high. The advertisements are also given a rating (e.g., low, medium and high), which corresponds to the amount paid for the ads to the delivery platform.

Figure 4:
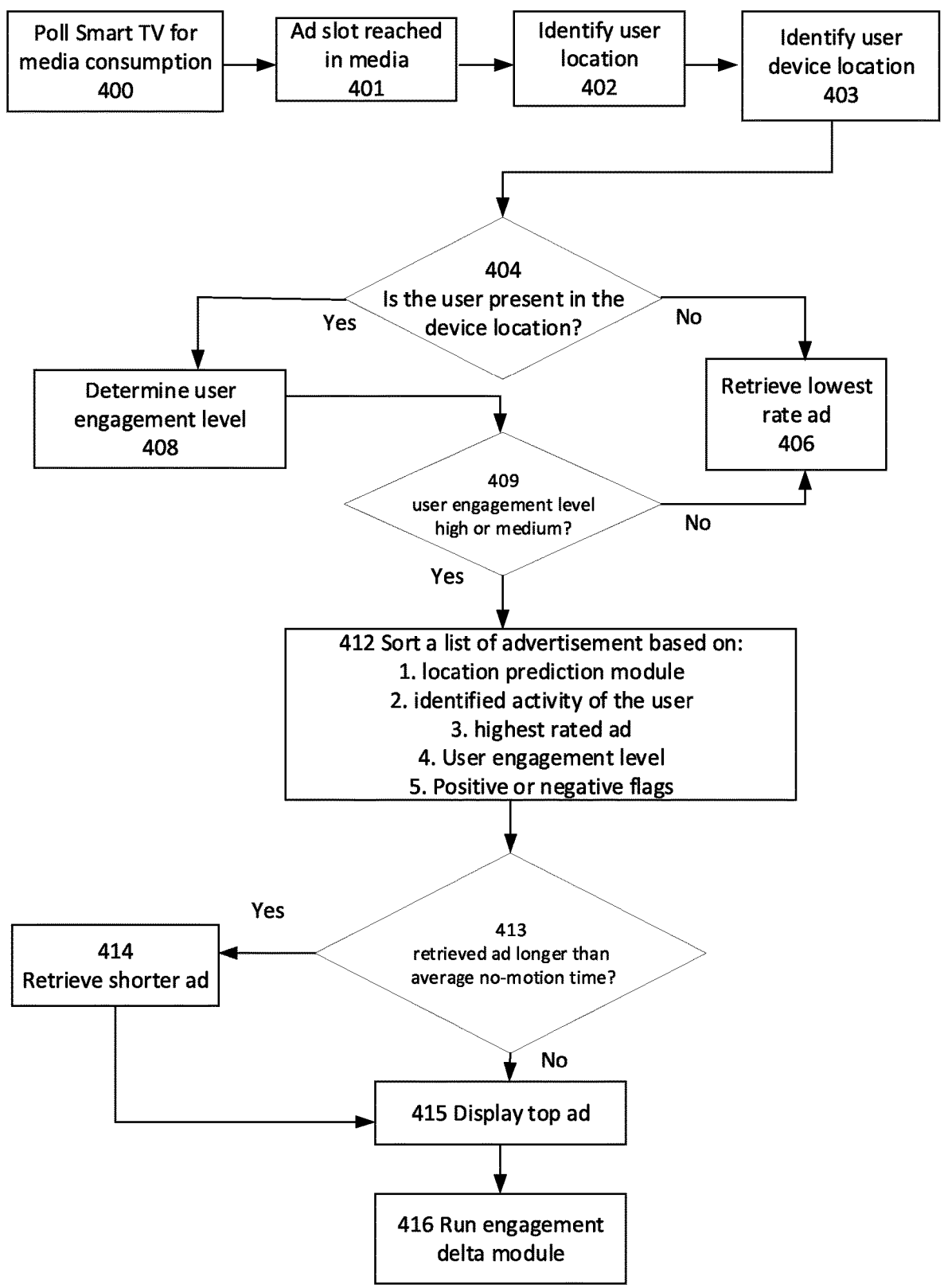
FIG. 4 is a flowchart illustrating an exemplary method for ad selection.

FIG. 4 is a flowchart illustrating an exemplary method for ad selection. Such method may be performed based on execution of ad selection module 132. At step 400, the process begins with polling the smart TV for media consumption by a user. The ad selection module 132 determines when an advertisement slot has been reached in the media being viewed at step 401. The ad selection module 132 receives user location from activity identification module 118 at step 402. At step 403, the ad selection module 132 receives device location from device database 124. The ad selection module 132 may also identify user devices close to the user based on location information regarding user devices in communication with the wireless access point 102. The ad selection module 132 then determines if the user is present in room with the smart TV by comparing the CSI data to predefined patterns that indicate the presence of a person in a mapped space at step 404.

In the event the user is determined to not be in the room with the smart TV, the lowest rated ad in the advertisement database 130 may be selected at step 406. The ad selection module 132 may also loop back to identifying user location and the location of the most proximate user device until the user is proximate to one of the user device that can deliver the selected advertisement. For example, if the user is in the basement doing laundry while the smart TV is in the living room, the ad may be displayed through a mobile phone which is in the same room as the user, or through a voice assistant connected speaker system.

If the user is present in the room where the device is set to display the ad, the ad selection module 132 determines the user engagement level at step 408. In an embodiment, the engagement level of the user is categorized (e.g., into predefined categories, such as high, medium, and low based on predefined category parameters). Those levels of engagement correspond to the motion/no motion CSI data detected. If the CSI data indicates the user is stationary, the user engagement may be classified as high. If the user is determined to be moving, engagement may be considered medium level; and if the trajectory of that movement has the user leaving the room, the user may be classified as associated with low engagement. At step 409, if the user engagement is low, the process may return to step 406 and retrieve the lowest rate ad.

At step 412, if the user engagement level is high or medium, the ad selection module 132 may rank and compile a list of ads based a plurality of criteria (e.g., location from location prediction module 133, identified activity from activity identification module 118, rate of the ad based on advertiser payment, positive or negative flags associated with the ad, and engagement level). The location prediction module 133 supplies the most likely destination(s) of the user based on historical movements to the ad selection module 132 such that the advertisement may be customized based on relevance to the location. For example, the location prediction module 133 may predicts that the kitchen and bathroom as the most likely destination for a user currently in the living room. The ad selection module 132 may filter advertisement in the advertisement database 130 for those that relate to kitchen and bathroom supplies, and one or more of the filtered advertisements may be sent to one or more media display devices (e.g., smart TV 140) in the living room.

The ad selection module 132 also considers identified activity of the user polled from the activity identification module 118. The ad selection module 132 retrieves from the advertisement database 130 one or more advertisements associated with the identified activity of the user. For example, if the most recent activity the user was engaged in was doing laundry, the ad selection module 132 may select an advertisement for detergent. An extension of that concept would be to add context from room to room. For example, a user is in the kitchen with a high amount of activity for greater than 30 minutes, several users were then in the dining room for greater than 45 minutes, and there is now user activity in the kitchen for greater than 15 minutes. This pattern would be recognized as a meal being prepared, had and cleaned up after. This triggers a historical pattern that can be used in ad selection, e.g. not to show food ads after this series.

The ad selection module 132 also considers rating of the advertisement. Targeted advertisements are usually sold in flights against a certain number of available impressions, and advertisers pay greater amounts to get advertisements viewed in a shorter time frame. To that end, the advertisement "rating" may be indicative of the cost paid by the advertiser. For example, if an advertiser paid a certain amount of money to have its advertisement displayed, such advertisement may have a higher rating than the advertisements of another advertiser who paid lower amounts.

The ad selection module 132 also considers user engagement level when sorting a list of advertisement to be displayed. For example, if the user engagement level is high, a high rated advertisement may be prioritized. If the user engagement level is medium or lower, a medium or lower rated advertisement is likely to be displayed.

The ad selection module 132 also considers positive or negative flags associated with an advertisement. For example, if an advertisement has a positive flag associated with the advertisement, the advertisement is moved up in the list of advertisement to be displayed first. When the system compares the advertisement with a positive flag with another advertisement without a positive flag or with a negative flag, the advertisement with a positive flag may be considered more favorably. Conversely, an advertisement with a negative flag associated with the advertisement may be considered less favorably than another advertisement with a positive flag or no flag. Disfavored advertisements may be automatically moved down in the list of advertisement to be displayed.

The aforementioned criteria may be considered in combination to sort and rank advertisement in the list of advertisement to be displayed. (Examples of the ad selection module 132 working in combination of the criteria). For example, the ad selection module 132 may filter the advertisements in the advertisement database 130 for advertisements that match the most likely destination(s) supplied by the location prediction module 133 and the level of engagement (e.g., medium engagement or higher as indicated by motion in the room with the smart TV 140). The location prediction module 133 may indicate that kitchen and bathroom are the most likely destinations for the user moving in the living room. The advertisement database 130 may be filtered by the destination locations and the engagement level to find the ad that paid the highest rate that can be charged based on the current engagement level and that is related to the user's most likely next destination location. Any ad that comes up through the filtering process that has a negative flag, is removed, and any positive flagged ad is automatically moved to the top of the list among equal ad rates. For example, if a pillow ad and a travel ad are equal in ad rate and location relevance, but bedding ads have a positive flag, the pillow ad may be selected over the travel ad at step 412. The ad selection module 132 identifies the highest rated advertisement (e.g., advertisers that have paid the highest fee levels) that have not been filtered out and returns to polling for an ad slot. For example, advertisements for pillows or sleep aids may be directed to a user whose next location predicted to be the bedroom.

At step 413, after it has been determined which advertisement is identified (e.g, from the list of advertisements) and prioritized for display, the ad selection module 132 determines the length of the top advertisement to be displayed. The ad selection module 132 polls activity history module 139 for the average no-motion time that the user had spent in the current room. If the advertisement is longer than average no-motion time of the user in the current room, the advertisement searches for the next advertisement in the list that is shorter than the average no-motion time of the user in the current room at step 414. The next top advertisement shorter than or the same as the average no-motion of the user in the current room may be displayed at step 415.

At step 416, the engagement delta module 134 is executed to provide another filter to be applied to the advertisement database 130 in a next iteration of step 412. If the user(s) demonstrate a noticeable decline in engagement based upon advertising content, the engagement delta module 134 flags the advertisement as negative. In this manner, advertisements in which the user is not interested—and that may result in less attention—are less likely to be selected.

Figure 5:
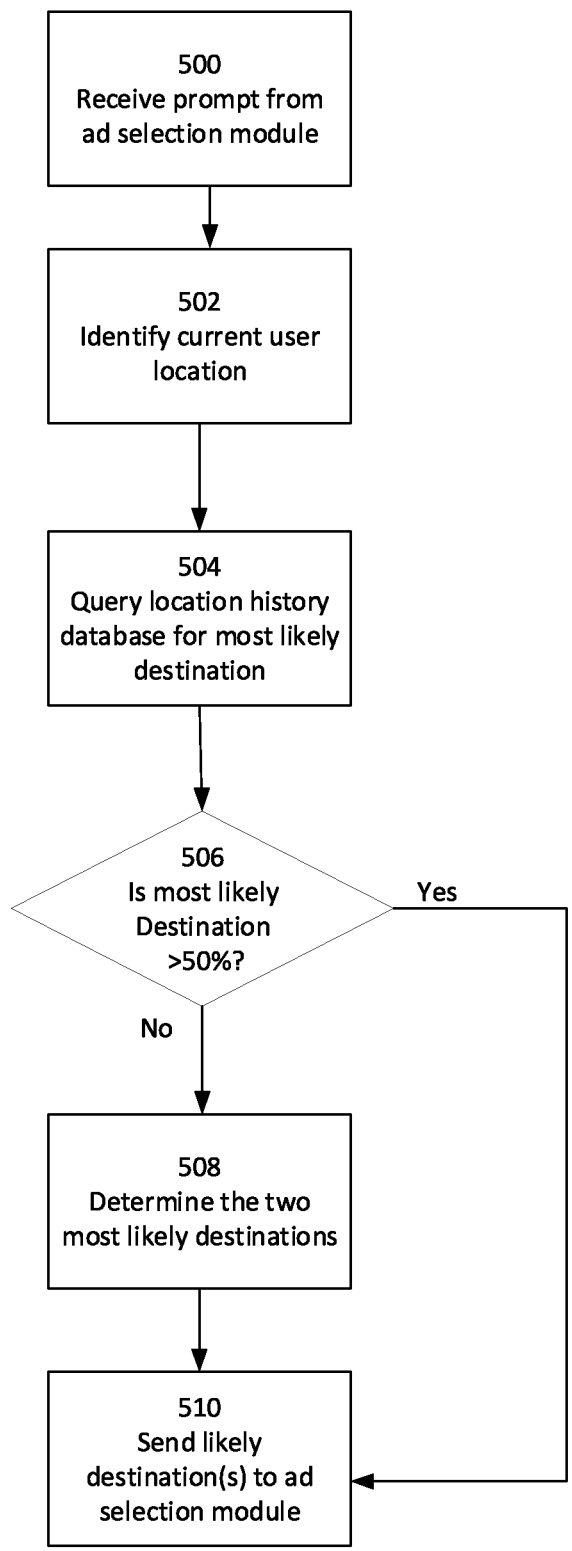
FIG. 5 is a flowchart illustrating an exemplary method for location prediction.

FIG. 5 is a flowchart illustrating an exemplary method for location prediction. Such method may be performed based on execution of a location prediction module 133. The process begins with receiving a prompt from the ad selection module 132 at step 500. The location prediction module 133 identifies the current user location based upon examination of the CSI data at step 502. The location prediction module 133 queries the location history database 128 for the next destination towards which the user is likely to head from the current location at step 504. For example, according to FIG. 2, when the user is in the bedroom, the user's next location is likely the bathroom (84% of the time). At step 506, the location prediction module 133 determines if the likelihood of the identified next destination is more than 50%. For example, according to FIG. 2, when the user is in the dining room, the most likely next destination is the living room. The living room is only the next location of the user 40% of the time, however. If the likelihood of the next destination is not at least 50% of the time (as in the dining room example), the top two destinations are selected. In the dining room example, the living room (destination 40% of the time) and the kitchen (destination 30% of the time) may be selected at step 508. The selected next destination(s) may be sent to the ad selection module 132 for use in filtering the ads to be displayed at step 510.

Figure 6:
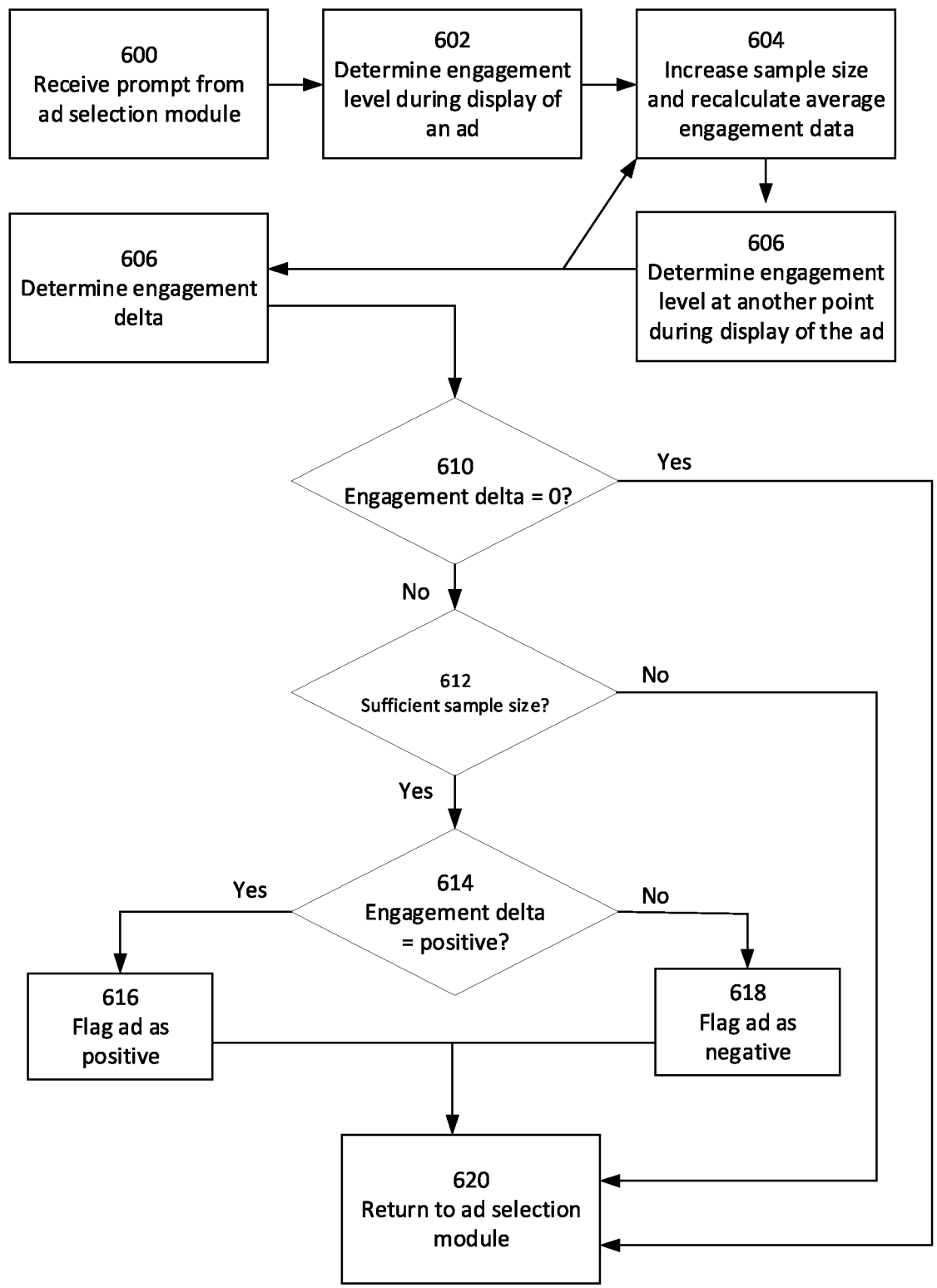
FIG. 6 is a flowchart illustrating an exemplary method for identifying engagement delta.

FIG. 6 is a flowchart illustrating an exemplary method for identifying engagement delta. Such method may be performed based on execution of an engagement delta module 134. The process begins with receiving a prompt from the ad selection module 132 at step 600. At step 602, the engagement delta module 134 determines the engagement level of a user at any point during a display of an advertisement. The level of engagement may correspond to the CSI data, which is indicative of amount and type of user movement or motion. If the CSI data indicates the user is stationary, the engagement level is classified as high engagement with the displayed media content. If the user is determined to be moving, the engagement level may be classified as medium level; and if the trajectory of user movement indicates the user leaving the room, the engagement level may be classified as low engagement.

At step 604, the average engagement data regarding views of the same advertisement or the same type or category of advertisements is received from the advertisement database 130. Sample size is increased by one, and the engagement level determined at step 602 is added to recalculate the average engagement level of viewing the same advertisement (or the same type or category of advertisements). As such, changes in the user's engagement level may be tracked when watching a certain type of advertisements over time.

At step 606, engagement level of the user is taken again at another point during the display of the advertisement. In an embodiment, one advertisement may be broken into multiple parts to obtain multiple data points of user engagement level in response to the advertisement. The engagement level could be measured in much shorter intervals, depending upon the computing power and memory storage available. Steps 604 and 606 may be repeated multiple times. The more data points that can be taken, the more effective the calculation of the average engagement and engagement delta may be.

At step 608, an engagement delta is determined from the multiple engagement level data. The engagement delta corresponds to a change in engagement level between the second engagement level and the first engagement level. In such embodiments, there may be three tiers of engagement, so a delta of greater than zero may indicate a move from one engagement level to the next. If the engagement is measured on a numerical scale, the delta threshold could be a percentage change.

Engagement delta that equals to zero means that there is no change in engagement level. If the engagement delta module 134 determines that the engagement delta is zero, the engagement delta module 134 returns to ad selection module 132 at step 610. If the engagement delta is not zero, the engagement delta module 134 determines if the sample size is significant enough to flag the advertisement (or advertisement category) as positive or negative at step 612. The larger the data set, the more effective the targeted advertising may be output at step 612.

At step 614, the engagement delta module 134 determines whether the engagement delta is positive. If the engagement delta is positive, the engagement delta module 124 flags the advertisement (or the advertisement category) as positive in the advertisement database 130 at step 616. If the engagement delta is negative, the engagement delta module 134 flags the advertisement or the advertisement category as negative in the advertisement database 130 at step 618. The method may then return to ad selection module 132 at step 620.

Figure 7:
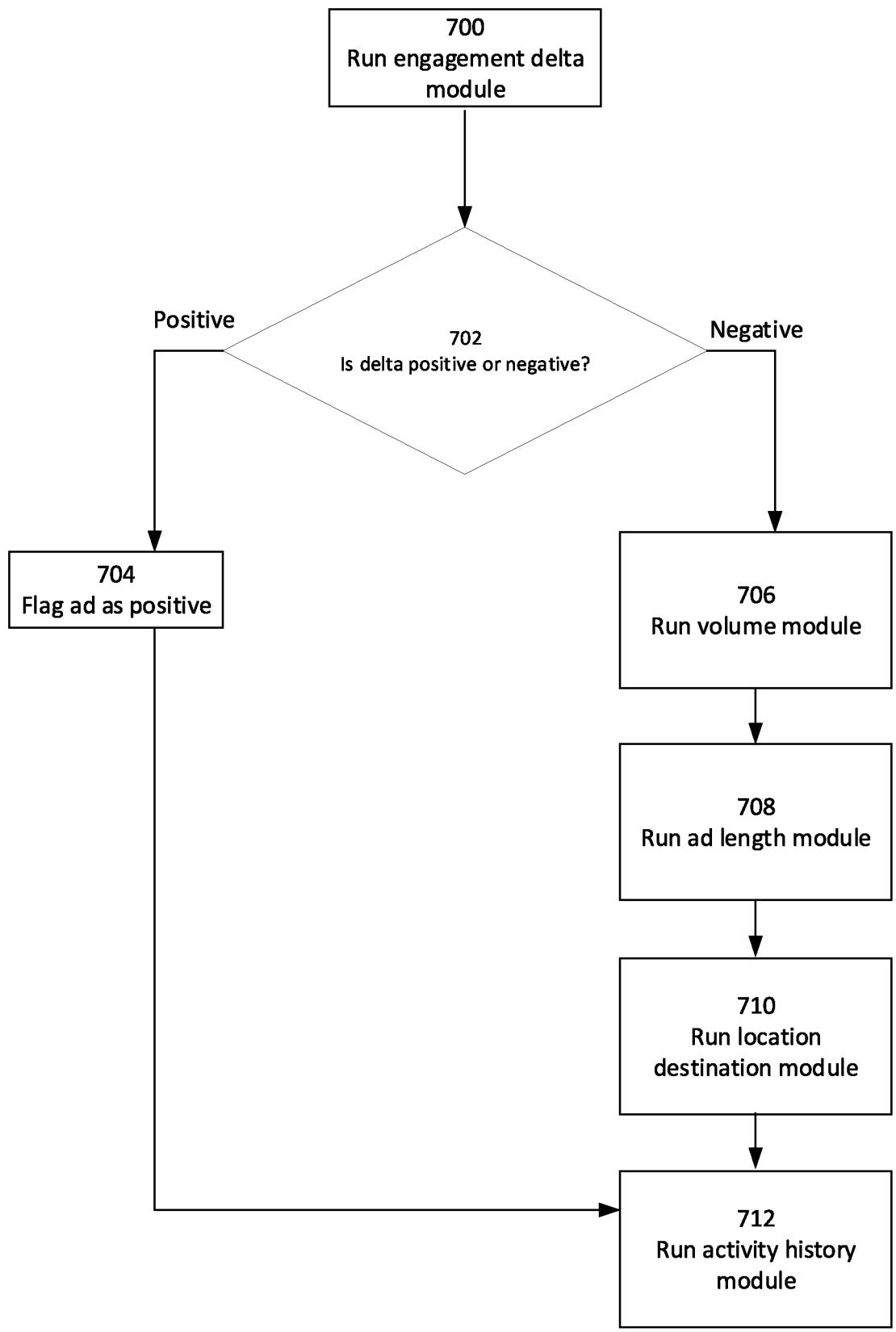
FIG. 7 is a flowchart illustrating an exemplary method for smart display based on engagement delta data.

FIG. 7 is a flowchart illustrating an exemplary method for smart display based on engagement delta data. Such method may be performed based on execution of engagement delta module 134 using engagement delta data in an implementation. The process begins with initializing engagement delta module 134 at step 700.

At step 702, the engagement delta module 134 determines if the engagement delta is positive or negative. If the engagement delta is positive, the advertisement is flagged as positive at step 704. If the engagement delta is negative, the negative engagement delta triggers a series of remedial modules that deal with the decrease in user engagement. At step 706, the negative engagement delta prompts initializing the volume module 135. At step 708, the negative engagement delta prompts initializing the ad length module 136. At step 710, the negative engagement delta prompts initializing the location destination module 137. At step 712, the change in engagement delta prompts initializing the activity history module 139.

Figure 8:
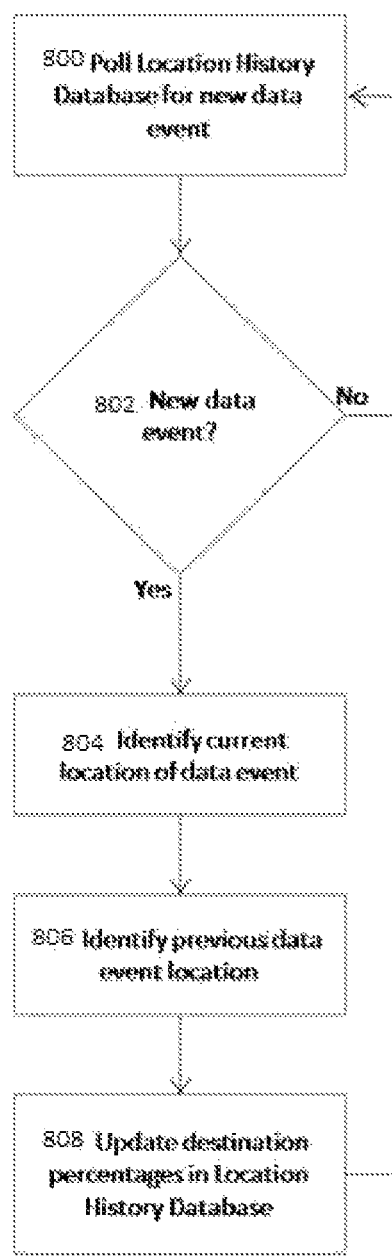
FIG. 8 is a flowchart illustrating an exemplary method for identifying location destination.

FIG. 8 is a flowchart illustrating an exemplary method for identifying location destination. Such method may be performed based on execution of a location destination module 137. The process begins with polling the location history database 128 for a new data point provided by the activity identification module 118 at step 800.

The location destination module 137 determines if there is a new data event at step 208. If there is no new data event, the location destination module 137 returns to polling at step 800. The location destination module 137 identifies the current location related to the data event at step 804. For example, the captured CSI data may indicate a motion in the bathroom. At step 806, the location destination module 137 identifies the previous data event location. For example, if a motion in the bathroom was detected, the activity identification module 118 may search for the location where the user was immediately before entering the bathroom. The user may have entered the bathroom from the bedroom, for example.

The location history module updates the destination percentages in the location history database 128. The destination for the bedroom may therefore be updated by adding one to the bathroom total and dividing by the new total number of data points. Thus, it may be shown that 84% of the time when motion is detected in the bedroom, the next location at which motion is predicted to occur is in the bathroom at step 808.

Figure 9:
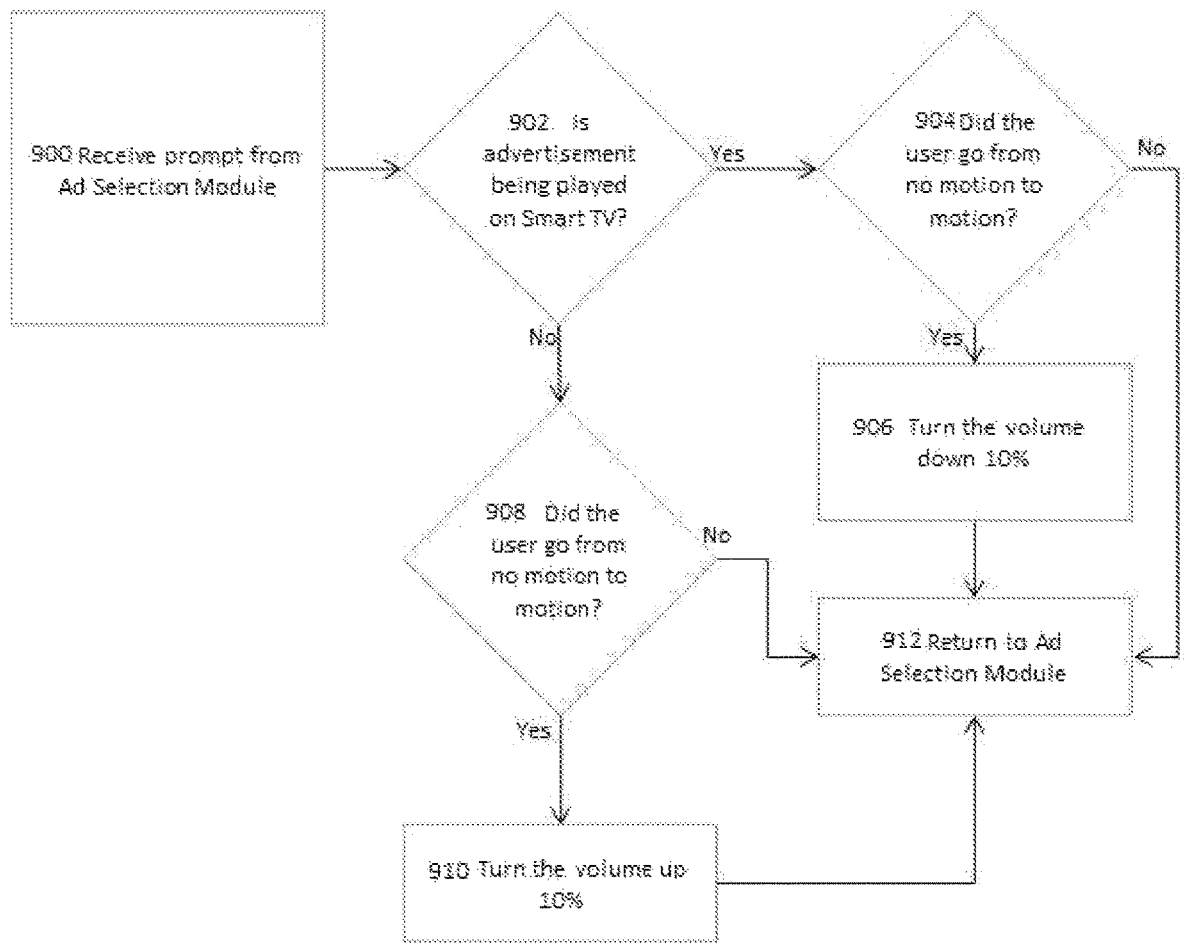
FIG. 9 is a flowchart illustrating an exemplary method for smart volume selection.

FIG. 9 is a flowchart illustrating an exemplary method for smart volume selection. Such method may be performed based on execution of a volume module 135. The process begins with reviving a prompt from the ad selection module 132 at step 900. It may then be determined if the advertisement is being played on the smart TV or on another user device at step 902. If the advertisement is being displayed on the smart TV, it may next be determines if the user transitions from a no-motion to a motion state at step 904. If the user transitions from a no-motion to a motion state, the volume module 135 decreases the volume of the advertisement by a certain percentage on the smart TV. The assumption is that a quick movement in response to the ad break starting may be from the volume of the ad being greater than the media volume at step 306. For example, if the volume module 135 determines that the user begins moving at the onset of a smart TV based ad, then the volume module may use that as an indication of the volume of the ad being too high relative to the media content and lower the volume. If the user is receiving the ad on another device, the module will interpret the transition from no motion to motion as a cue to increase the volume of the ad as the user is active.

If the advertisement is not being displayed on the smart TV, it may be determines if the user transitions from a no motion to a motion state at step 308. If the user transitions from a no-motion to a motion state, the volume module 135 increases the volume of the advertisement by a certain percentage of the original volume. The assumption is that if the user is watching an advertisement in motion, the volume needs to be a little louder for the user to hear properly at step 910. The location destination module 137 returns to the ad selection module 132 at step 912.

Figure 10:
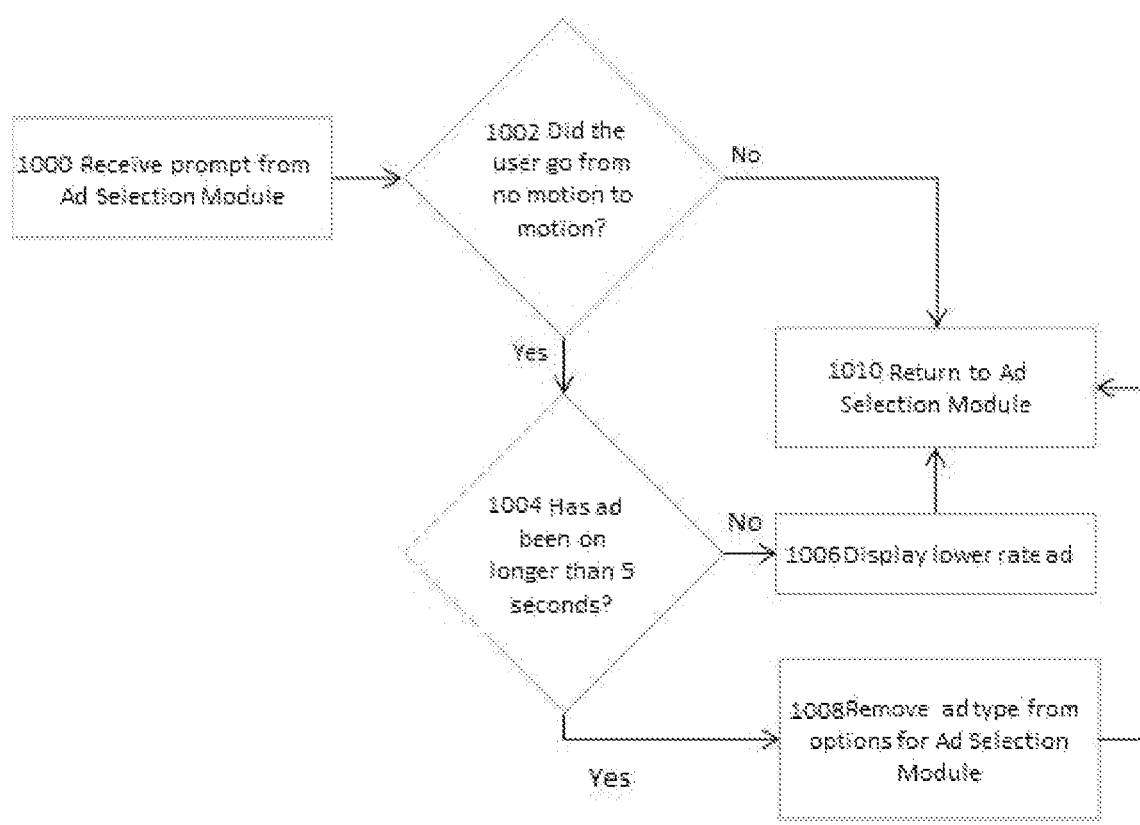
FIG. 10 is a flowchart illustrating an exemplary method for smart ad length selection.

FIG. 10 is a flowchart illustrating an exemplary method for smart ad length selection. Such method may be performed based on execution of an ad length module 136. The process begins with receiving a prompt from the ad selection module 132 at step 1000. It may be determined if the user transitioned from a no-motion state to a motion state at step 1002. Such determined may be based on an examination of the impulse response (CSI) data interpretations by the activity identification module 118.

The ad length module 136 determines if the advertisement has been playing for longer than a predetermined threshold (e.g., five seconds) and if there is enough time left in the current ad slot left to play an alternate advertisement at step 1004. If the advertisement has been playing for less than five seconds, the ad length module 136 displays a lower rate ad. The rationale is that advertisers who paid a premium rate do not want ad buys that are displayed when the user is not paying attention. Other advertisers may exchange less viewer attention for lower cost ads that may be inserted in these spots at step 1006. If the advertisement has been playing for more than five seconds, and therefore cannot be replaced in the ad slot, the ad length module 136 removes the advertisement (or advertisements in that category) from further consideration by the ad selection module 132 during the media consumption event at step 1008. The ad length module 136 returns to the ad selection module 132 at step 1010.

Figure 11:
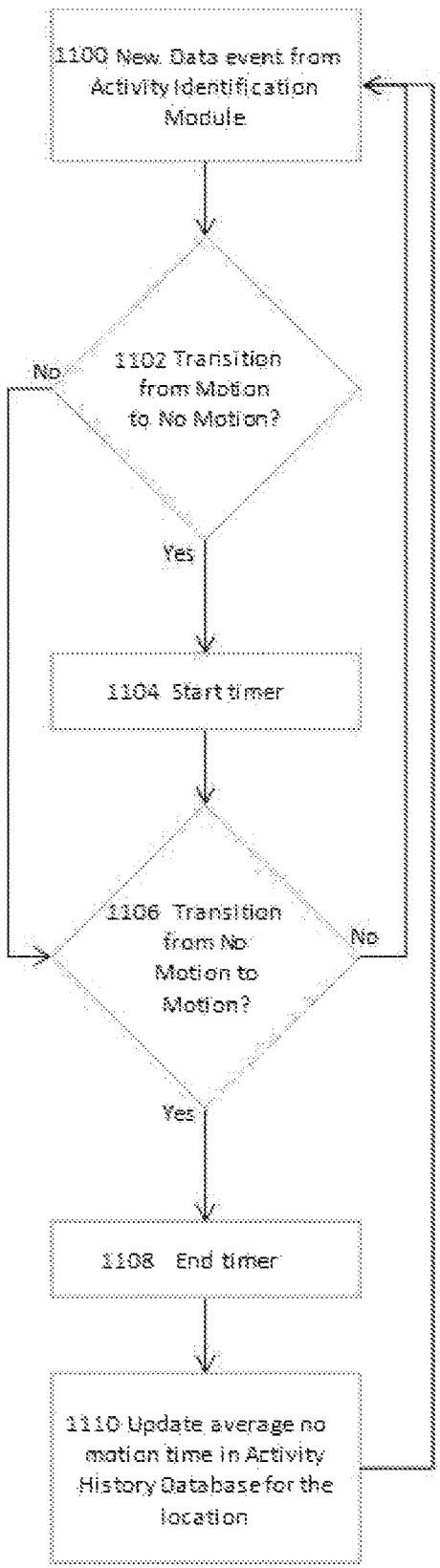
FIG. 11 is a flowchart illustrating an exemplary method for tracking activity history.

FIG. 11 is a flowchart illustrating an exemplary method for tracking activity history. Such method may be performed based on execution of an activity history module 139. The process begins with polling the activity identification module 118 for data points indicating a motion/no motion determination. Specifically, the frequency and phase response data may be obtained at step 1100. Based on an examination of the frequency and phase response data interpretations, the activity identification module 118 may determine if the user transitioned from a motion state to a no-motion state occurs at step 1102.

The activity history module 139 starts a timer at step 1104. The activity history module 139 receives an indication from the activity identification module 118 of whether the user has transitioned from a no-motion state to a motion state at step 1106. The activity history module 139 ends the timer at step 1108 and updates the average no-motion time for the location in the activity history database 138. For example, the user's average no-motion time when seated in the living room may be 15 minutes, whereas the user's average no-motion time is only 90 seconds in the kitchen. Such data may be used to impact the types of advertisements displayed. Additionally, the activity history data can be used to infer viewer type, and users with longer average no-motion times may receive different types of advertisements at step 1110.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of using passive motion data for advertisement targeting, the method comprising:

identifying one or more locations of a user within a monitored space based on observed strength of wireless impulse response data from one or more wireless access points;
identifying one or more physical activities of the user at each of the identified locations based on observed pattern changes in an amplitude of the wireless impulse response data from the one or more wireless access points;
determining an engagement level of the user within the monitored space at each of the identified locations associated with each of the physical activities based on other pattern changes in the amplitude of the wireless impulse response data from the one of the wireless access points;
aggregating the physical activities in a history database based on the identified physical activities at each of the identified locations and the engagement level to determine a historical pattern of physical activities;
identifying a current physical activity of the user at a current location within the monitored space based on pattern changes in an amplitude of current wireless impulse response data from the one of the wireless access points; and
prioritizing a list of advertisements for display on a display device based on the current physical activity of the user and the historical pattern of activities.

2. The method of claim 1, wherein identifying the activities of the user includes:
identifying a duration of each of the physical activities based on the wireless impulse response data; and
storing the duration in the history database.

3. The method of claim 1, wherein
identifying the physical activities of the user includes storing the identified location of the user during each of the identified physical activities in the history database.

4. The method of claim 1, wherein identifying the activities of the user includes:
identifying a level of physical activity of each of the physical activities based on pattern changes of amplitude of the wireless impulse response data; and
storing the level of physical activity in the history database.

5. The method of claim 1, wherein
identifying the physical activities of the user includes comparing the wireless impulse response data to one or more frequency response profiles of different physical activities stored in a database.

6. The method of claim 1, wherein
prioritizing the list of advertisements is further based on the engagement level.

7. The method of claim 1, further comprising identifying a series of consecutive activities in the historical pattern of activities, wherein prioritizing the list of advertisements includes deprioritizing a type of advertisement based on the series of consecutive activities.

8. The method of claim 7, further comprising
generating a display of top advertisement from the list of advertisements; wherein
the top advertisement is displayed on the display device following the series of consecutive activities.

9. The method of claim 1, further comprising adjusting the list of advertisements based on one or more changes in the engagement level of the user.

10. A method of using passive motion data for advertisement targeting, the method comprising:
identifying a first location of a user and a first device for playing an advertisement within one or more monitored spaces based on wireless impulse response data from one or more wireless access points;
determining a change in engagement of the user based on a change in pattern of the wireless impulse response data;
determining a change in location of the user to a second location, wherein a second device plays the advertisement;
identifying a volume at which the advertisement is played from the second device; and
adjusting the volume based on a device type of the second device and the change in location of the user by comparing the volume at which the advertisement is played on the second device with a volume of media content preceding the advertisement.

11. The method of claim 10, wherein identifying the first device is based on proximity to the first location of the user as indicated by the wireless impulse response data.

12. The method of claim 10, further comprising identifying a speaker system associated with the first device.

13. The method of claim 10, wherein adjusting the volume is further based on the change in engagement of the user.

14. The method of claim 10, wherein adjusting the volume includes adjusting the volume at which the advertisement is played relative to the volume of media content preceding the advertisement.

15. The method of claim 10, further comprising identifying an activity engaged by the user at the second location based on the wireless impulse response data.

16. The method of claim 10, further comprising identifying when the change in engagement of the user occurred relative to a duration that the advertisement is played.

17. A method of using passive motion data for advertisement targeting, the method comprising:
storing a history of activities of a user and measured no-motion time associated with each of the activities within a monitored space;
determining an average no-motion time of the user within the monitored space for each activity within the monitored space;
identifying a current activity of a user within the monitored space based on wireless impulse response data from a wireless access point;
determining a list of advertisements based on the identified current activity;
displaying a top advertisement from the list of advertisements;
determining a change in engagement of the user during the current activity based on a change in pattern of the wireless impulse response data; and
switching the top advertisement based on the average no-motion time associated with the current activity.

18. The method of claim 17, further comprising determining a duration of each advertisement in the list of advertisements.

19. The method of claim 18, wherein switching the top advertisement includes:
determining that the duration of the top advertisement is longer than the average no-motion time; and
switching to another advertisement from the list of advertisements that has a shorter duration than the average no-motion time of the user associated with the current activity.

20. The method of claim 18, wherein switching the top advertisement includes determining that the duration of the top advertisement is longer than the average no-motion time; and switching to another advertisement from the list of advertisements that has a same duration as the average no-motion time of the user associated with the current activity.

* * * * *